(12) United States Patent
Norioka et al.

(10) Patent No.: US 6,904,164 B2
(45) Date of Patent: Jun. 7, 2005

(54) METHOD OF INSPECTING ACCURACY IN STITCHING PATTERN ELEMENTS

(75) Inventors: Setsuo Norioka, Tokyo (JP); Manabu Saito, Tokyo (JP); Akira Tohyama, Tokyo (JP)

(73) Assignee: JEOL Ltd., Tokyo (JP)

( * ) Notice: Subject to any disclaimer, the term of this patent is extended or adjusted under 35 U.S.C. 154(b) by 684 days.

(21) Appl. No.: 09/860,242

(22) Filed: May 18, 2001

(65) Prior Publication Data

US 2001/0053243 A1 Dec. 20, 2001

(30) Foreign Application Priority Data

May 18, 2000  (JP) ........................................ 2000-146348

(51) Int. Cl.[7] ............................. G06K 9/00; G06K 9/36; G06K 9/32
(52) U.S. Cl. ...................... 382/145; 382/149; 382/151; 382/284; 382/294; 348/86; 348/87; 356/239.3; 250/559.04
(58) Field of Search ................................. 382/141, 144, 382/145, 148, 149, 151, 284, 294; 348/86, 87; 356/239.3, 237.3, 237.4; 250/559.01, 559.04, 559.19, 559.2, 306, 307, 492.1, 492.22

(56) References Cited

U.S. PATENT DOCUMENTS 5,023,917 A * 6/1991 Bose et al. .................. 382/149

6,396,943 B2 * 5/2002 Yamashita ................... 382/144
6,723,973 B2 * 4/2004 Saito ........................... 238/151

OTHER PUBLICATIONS

"Evaluation of an advanced mask writing system", Shinji Kubo et al., Part of the SPIE Symposium on Photomask and X–Ray Technology VI, Yokohama, Japan, Sep. 1999, *SPIE* vol. 3748, pp. 426–435.

* cited by examiner

Primary Examiner—Bhavesh M. Mehta
Assistant Examiner—John Strege
(74) Attorney, Agent, or Firm—Webb Ziesenheim Logsdon Orkin & Hanson, P.C.

(57) ABSTRACT

A method of quickly and accurately inspecting the stitching accuracy at which regions of a lithographic pattern are stitched at boundaries. The numerous regions of the lithographic pattern are exposed or delineated, one at a time. Inspected regions are scanned with a charged-particle beam to detect secondary electrons. The obtained signal is stored as an inspected image in an image memory, together with positional data about the inspected regions. After completion of acceptance of images from all the inspected regions, the inspected image is compared with a separately prepared reference image by an image processing unit. Pattern elements in the inspected regions corresponding to the reference image are extracted. Deviations at field boundaries or the like can be detected from the relative positions of these pattern elements, if any.

12 Claims, 12 Drawing Sheets

METHOD OF INSPECTING ACCURACY IN STITCHING PATTERN ELEMENTS

BACKGROUND OF THE INVENTION

1. Field of the Invention

The present invention relates to a method of inspecting the stitching (or connecting) accuracy in stitched pattern elements that are lithographically formed in desired regions successively on a semiconductor wafer, a liquid crystal panel, a mask, or the like, using an exposure system, such as an electron-beam lithography system during the process of fabrication of semiconductor devices, a mask, or the like.

2. Description of the Related Art

In an electron-beam lithography machine, an electron beam is deflected according to a desired pattern. Thus, the desired pattern is drawn. A variable-shaped beam (VSB) lithography machine is one such electron-beam lithography machine. In the VSB lithography machine, a deflector mounted between two rectangular apertures shapes the cross section of an electron beam into a rectangle.

In particular, the image of the first rectangular aperture is projected onto the second rectangular aperture. The electron beam passed through the first rectangular pattern is deflected to vary the projection position on the second rectangular aperture. An electron beam having a different cross-sectional area is formed. This shaped electron beam is directed (shot) onto a material on which a desired pattern is to be drawn.

One example of a variable-shaped beam lithography machine is shown in FIG. 1, where an electron gun 1 emits an electron beam EB that is directed onto a first shaping aperture 3 via an illumination lens 2.

The image of the aperture of the first shaping aperture is focused onto a second shaping aperture 5 by a shaping lens 4. The position of the focus can be varied by a shaping deflector 6. The image shaped by the second shaping aperture 5 is directed onto a material 9 on which a desired pattern is to be drawn, via a reduction lens 7 and via an objective lens 8. The position on the material 9 struck by the image can be changed by a positioning deflector 10.

A control CPU 11 routes pattern data from a pattern data memory 12 to a data transfer circuit 13. The pattern data from the data transfer circuit 13 is sent to a control circuit 14, another control circuit 15, a further control circuit 16, and a blanking control circuit 18. The control circuit 14 controls the shaping deflector 6. The control circuit 15 controls the positioning deflector 10. The control circuit 16 controls excitation of the objective lens 8. The blanking control circuit 18 controls a blanking electrode 17 for blanking the electron beam generated from the electron gun 1.

A shot (exposure) time correcting memory 19 is connected with the blanking control circuit 18. The blanking signal from the blanking control circuit 18 is corrected according to the value from the shot time correcting memory 19. The control CPU 11 controls a driver circuit 21 for a stage 20 on which the material 9 is placed, to move the material across each field. The operation of this structure is next described.

The fundamental drawing operation is first described. Pattern data stored in the pattern data memory 12 is read out successively and sent to the data transfer circuit 13. The deflection control circuit 14 controls the shaping deflector 6 according to the data from the data transfer circuit 13. The control circuit 15 controls the positioning deflector 10.

As a result, the cross section of the electron beam is shaped into each individual element of the desired pattern by the shaping deflector 6. The elements of the pattern are successively shot onto the material 9, thus drawing the desired pattern. At this time, a blanking signal is sent from the blanking control circuit 18 to the blanking electrode 17, so that the electron beam is blanked in synchronism with the bombardment of the material 9 by the electron beam.

Where a different region on the material 9 is written lithographically, an instruction is given from the control CPU 11 to the stage driver circuit 21, causing the stage 20 to move a desired distance. The distance traveled by the stage 20 is monitored by a laser interferometer (not shown). The position of the stage is accurately controlled according to the results of measurements obtained by the laser interferometer.

Where a pattern is drawn on a resist lying on a wafer by the aforementioned electron beam lithography system or other system to form an LSI pattern, the electron beam deflection range of the system is up to only about 5 mm square for a single die, or chip, 10 to 20 mm square. Where a pattern of a structure such as an LSI gate chain is formed, it is necessary to form a pattern stitched (or connected) over the whole chip.

Accordingly, in order to form such a pattern, the stage carrying the wafer and the electrical deflection system are so controlled that pattern elements are stitched at intervals of 5 mm. Therefore, in the system shown in FIG. 1, the positioning deflector 10 is shown to consist of a single deflection system. In practice, a main (or primary) deflector for deflection at intervals of 5 mm is mounted. For deflection within a range less than 5 mm, a secondary deflection system or a ternary deflection system is provided. For example, the deflection range of the secondary deflection system is 500 $\mu$m. The deflection range of the ternary deflection system is 50 $\mu$m.

As a lithography system other than the variable-shaped beam lithography system shown in FIG. 1, a system using a cell projection lithography technique has been developed. In this system, an aperture having tens of patterns built therein is placed in the electron beam path. The electron beam passed through this aperture is reduced to 1/25 and directed to a resist applied to the wafer. A pattern is written to a cell 5 $\mu$m square at maximum per shot. Since the shot position can be specified with arbitrary coordinates, a space may be formed between successive cells. The boundaries (or stitches or joints) between the successive cells can be brought into contact with each other. These boundaries are hereinafter referred to as shot boundaries. With this structure, any desired pattern ranging from a small pattern of 0.1 $\mu$m to a large pattern covering the whole chip can be drawn at will.

In the chip lithographically written by the aforementioned electron beam lithography system and having a size of 10 mm square, the number of field boundaries reaches 40,000. The number of boundaries of the cells amounts to 4 million. This is illustrated in FIG. 2, where a number of chips T are formed within a wafer W. Each chip T is virtually divided into main fields F1. Each main field F1 is virtually divided into subfields F2. Each subfield F2 is virtually divided into sub-subfields F3.

For example, the size of the chip T is 10 mm×10 mm. The size of each main field F1 is 5,000 $\mu$m ×5,000 $\mu$m. The size of each subfield F2 is 500 $\mu$m×500 $\mu$m. The size of each sub-subfield F3 is 50 $\mu$m×50 $\mu$m.

In the electron beam lithography system, the drawn region is virtually divided into smaller regions. The pattern is drawn for each smaller region. That is, after a certain region is written, the stage is moved, and then the main deflection system or secondary or ternary deflection system is so controlled as to write a pattern element to the adjacent region. As a result, the drawn pattern elements may be misaligned at the interface B (field boundary or shot boundary) between the adjacent different regions. The space between the pattern elements may produce an error.

FIGS. 3(a)–3(c) illustrate deviations of pattern elements at the field interface B. A pattern should be formed as shown in FIG. 3(a). The pattern elements may be misaligned in the Y-direction as shown in FIG. 3(b). As shown in FIG. 3(c), the pattern elements may be misaligned in the X-direction, thus splitting the pattern. In FIGS. 3(a)–3(c), the broken lines indicate the interface.

At the field interface in the pattern as shown in FIG. 3(b), the amount of allowable deviation is less than tenth the design dimension because of the performance of the LSI. For example, in the case of the pattern width of 0.1 μm, the allowable deviation is less than 10 nm. In FIG. 3(c), the pattern elements that should be stitched break. This is not allowed because of the actual performance of LSI. Where the amount of deviation is in excess of the maximum allowable value, the electron beam lithography system has a misadjustment. Therefore, it is necessary to find the misadjustment and to readjust the system.

In order to find where a fault is present within the electron beam lithography system, it is necessary that a pattern be drawn on the chips over the whole wafer, the numerous boundaries within the chips be inspected, and the amounts and directions of deviations of the pattern elements at the boundaries be measured. The results of the measurements permit misadjustments in the electron beam lithography system to be estimated empirically. If the misadjustments are found, then it is possible to readjust or repair the electron beam lithography system appropriately.

SUMMARY OF THE INVENTION

In view of the foregoing, the present invention has been made. It is an object of the present invention to provide a method of quickly and accurately inspecting the accuracy at which pattern elements that have been separately lithographically written are stitched at boundaries.

The present invention provides a method of inspecting the accuracy at which desired regions on a material are stitched, the material having been exposed successively to form a pattern, the method starting with selecting an inspected region containing at least two pattern features existing in the exposed regions that are different from each other. Then, signals arising from the inspected region are detected. The positions of the pattern features are detected from the detected signals. Data about the reference region corresponding to the inspected region is detected, and the data is treated as reference data. The positions of the pattern elements within the reference region are found from reference data. The positions of the pattern elements are compared with positions of the certain pattern elements within the inspected region, whereby inspecting the accuracy at which the exposed regions within the inspected region are stitched. Consequently, the accuracy at which stitchings are made at boundaries in the pattern whose numerous regions have been separately exposed can be inspected at high accuracy and high speed.

Other objects and features of the invention will appear in the course of the description thereof, which follows.

DESCRIPTION OF THE PREFERRED EMBODIMENTS

Figure 1:
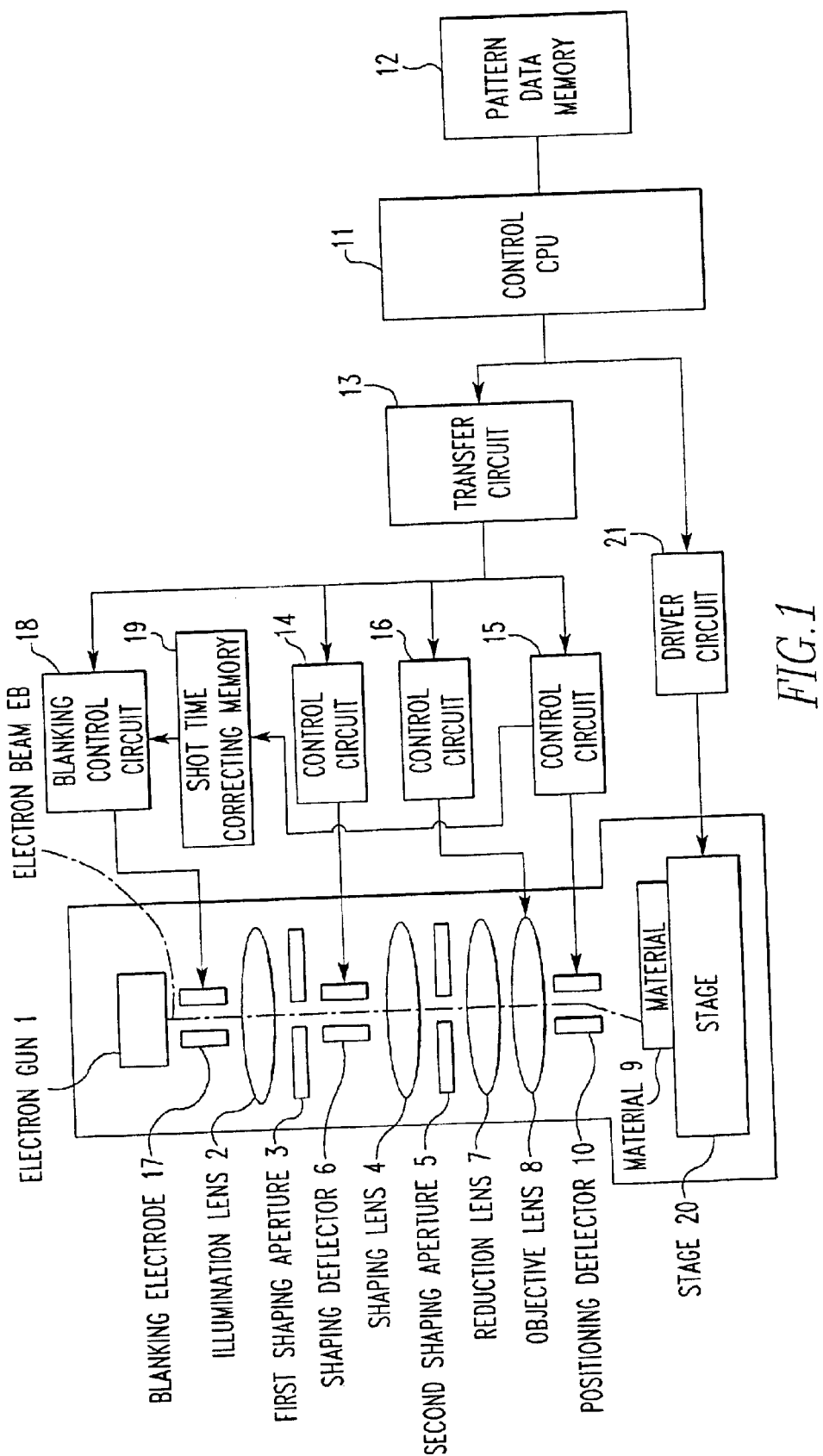
FIG. 1 is a block diagram of a variable-shaped beam lithography machine.
Figure 4:
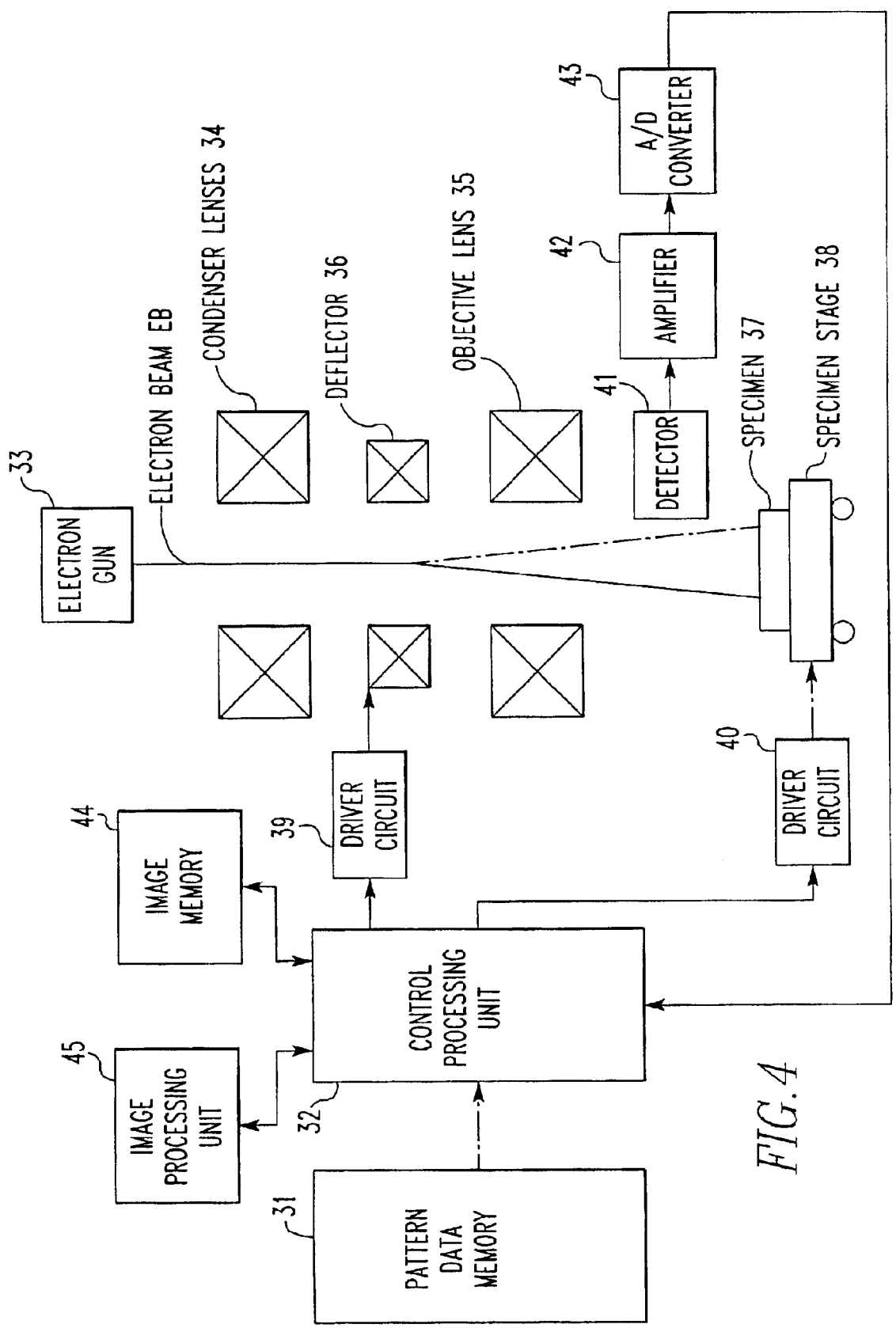
FIG. 4 is a schematic diagram of a fundamental system for carrying out an inspection method in accordance with the present invention.

Referring to FIG. 4, there is shown one example of a fundamental system for carrying out an inspection method embodying the concept of the present invention. This system has a pattern data memory 31 in which data about a pattern to be delineated by the electron beam lithography system of FIG. 1 is stored. The pattern data in the memory 31 is sent to a control processing unit 32 forming a part of the inspection system.

The control processing unit 32 controls a scanning electron microscope (SEM) included in the inspection system. The SEM comprises an electron gun 33, a system of condenser lenses 34, an objective lens 35, a deflector 36, and a movable specimen stage 38 carrying a specimen 37 thereon.

An electron beam EB generated from the electron gun 33 and accelerated is sharply focused onto the specimen 37 consisting of a wafer by the system of condenser lenses 34 and the objective lens 35. The position on the specimen 37 hit by the electron beam is scanned in two dimensions by the deflector 36. The region on the specimen illuminated by the beam can be moved by moving the specimen stage 38 in the X- and Y-directions arbitrarily. The deflector 36 and the specimen stage 38 are driven by driver circuits 39 and 40, respectively, which in turn are controlled by the control processing unit 32.

Secondary electrons, for example, produced by the incidence of the electron beam EB on the specimen 37 are detected by a secondary electron detector 41. The output signal from the detector 41 is supplied as image data representative of the specimen surface topography to the control processing unit 32 via an amplifier 42 and via an A/D converter 43. In the method described herein, secondary electrons are used. However, any signal can be used as long as it can be derived from the specimen as the electron beam hits the specimen, such as backscattered electrons or absorption current.

The image data supplied to the control processing unit 32 is sent to the image memory 44, where the data is stored. The data stored in the image memory 44 is read out and supplied to an image processing unit 45, where the accuracy in stitching pattern elements is measured based on the image data. The operation of this structure is next described.

Figure 2:
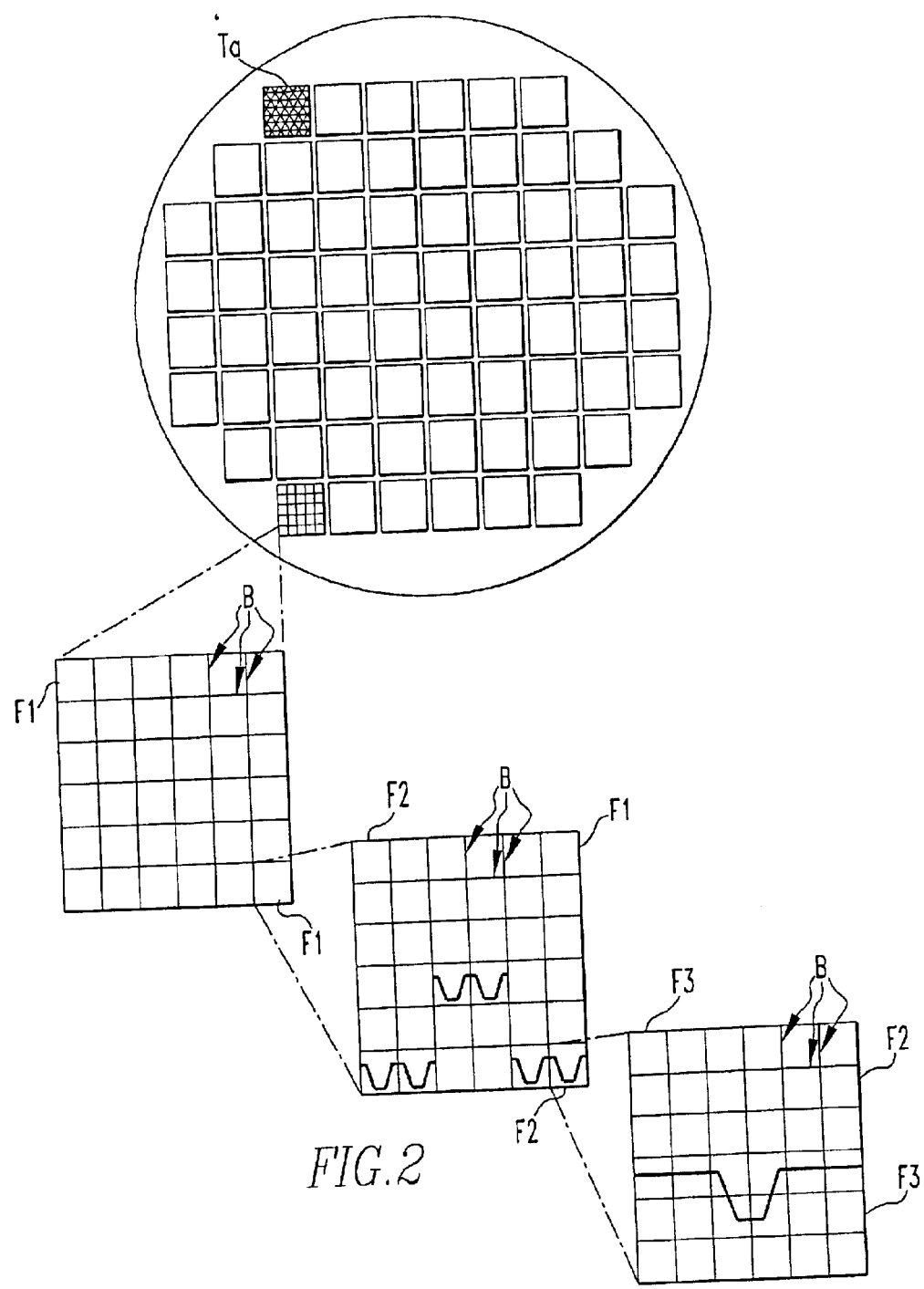
FIG. 2 schematically illustrates the relations of chips and fields to a wafer on which the chips and fields are formed.
Figure 3A:
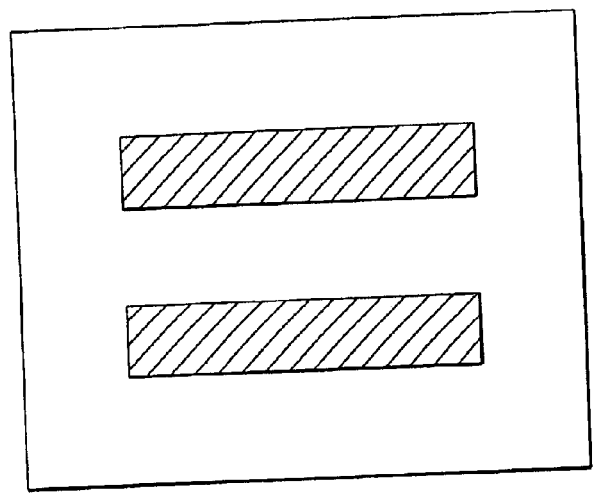
FIGS. 3(a)–3(c) illustrate deviations of pattern elements at field interfaces.
Figure 3B:
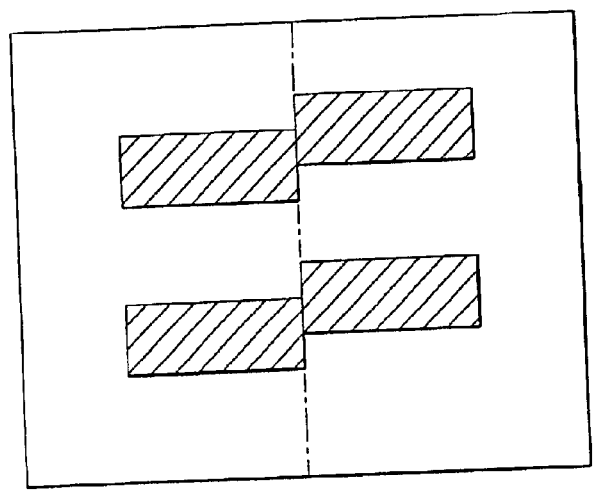
Figure 3C:
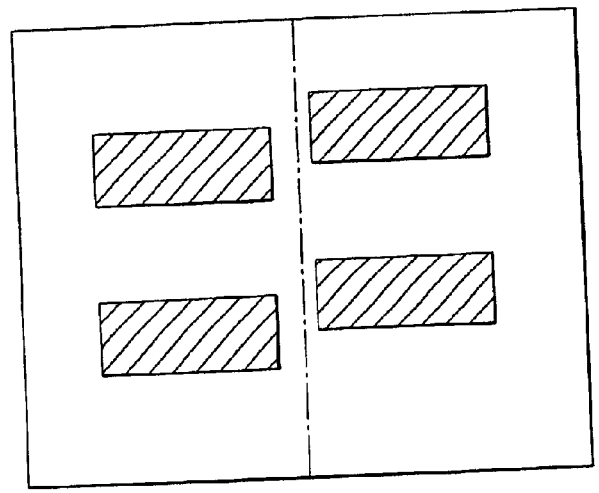

A wafer having chips T over which a pattern has been written by the electron beam lithography system shown in FIG. 1 is used as the specimen 37. Where a pattern is delineated by the lithography system shown in FIG. 1, the same pattern is written into a certain chip Ta (FIG. 2) only by one deflection system such that no boundaries are created in gates or contact holes which affect the performance of the LSI device. This chip Ta is used as a reference chip.

Then, a reference image is collected using this reference chip. The coordinates of field boundaries and shot boundaries of chips other than the reference chip Ta, i.e., chips to be inspected, are known at the time of lithographic drawing. The control processing unit 32 controls the specimen stage 38 and the deflector 36 according to the known coordinates. The electron beam is scanned across portions of the reference chip Ta of the specimen 37 corresponding to the aforementioned boundaries. The resulting output signal from the detector 41 is accepted as an image signal into an image memory 44 via the amplifier 42, the A/D converter 43, and the control processing unit 32. At this time, image signals (reference images) derived from reference patterns are stored together with their coordinates.

Figure 5:
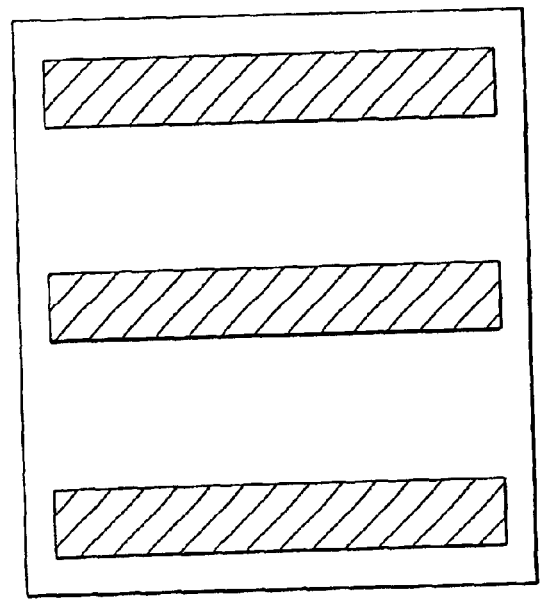
FIG. 5 is a diagram showing one example of a sequence of accepted reference image elements.

The magnification in taking the reference images is set equal to or lower than the magnification in inspecting other chips, for the following reason. The reference images produce no deviation. Experiment has shown that, if the original image is taken at a low magnification (e.g., one-eighth in an extreme case), and if the image is enlarged up to the size used for inspection by interpolation or other image processing technique, the properties of the reference images are not lost. Conversely, the reference images can be taken at a magnification greater than that used at the time of inspection. However, the field of view is narrowed, increasing the number of reference images with undesirable results.

Where a repeating pattern exists within the field of view, it is not necessary to accept the whole field of view as a reference image. One or plural patterns may be accepted as a reference image and stored. FIG. 5 shows one example of an accepted reference image. In this case, the reference image includes three pattern elements. Only one of these pattern elements can be used as a reference image.

Then, an image of each inspected chip is accepted. The inspection system shown in FIG. 4 automatically accepts images of inspected chips successively under inspection conditions. The images are stored in the image memory 44 together with coordinates. In particular, the control processing unit 32 controls the driver circuit 40 for the specimen stage 38 under predetermined conditions. Each inspected region on the wafer specimen 37 is brought to the optical axis of the electron beam. The processing unit 32 controls the deflector 36 via the driver circuit 39 and scans the electron beam across each inspected region.

Figure 6:
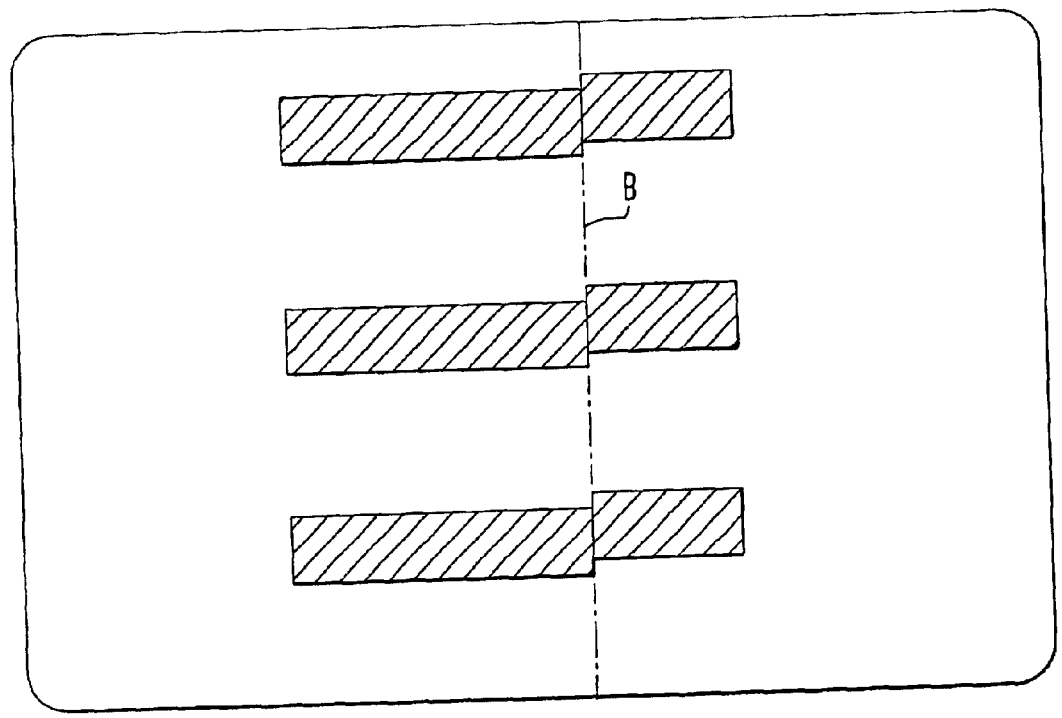
FIG. 6 is a diagram showing one example of an inspected image.

The electron beam is scanned across each inspected region, and signals indicating resulting secondary electrons are detected. The signals are stored in the image memory 44 together with the coordinates. After completion of the acceptance of the images of all the inspected regions, each inspected image is compared with the reference image corresponding to the coordinates of the inspected region by the image processing unit 45. Deviations at field boundaries or shot boundaries are detected, if any. FIG. 5 shows the reference image as mentioned previously. FIG. 6 shows an image derived from an inspected region corresponding to the reference image shown in FIG. 5. In FIG. 6, line B indicates a boundary at which stitchings are made.

The detection of the deviations is carried out precisely using a software making use of known feature extraction algorithms. The images of the detected portions are marked with rectangles or circles on the display. The coordinates of the center of each region are calculated and, at the same time, the amount of deviation is calculated.

Figure 7:
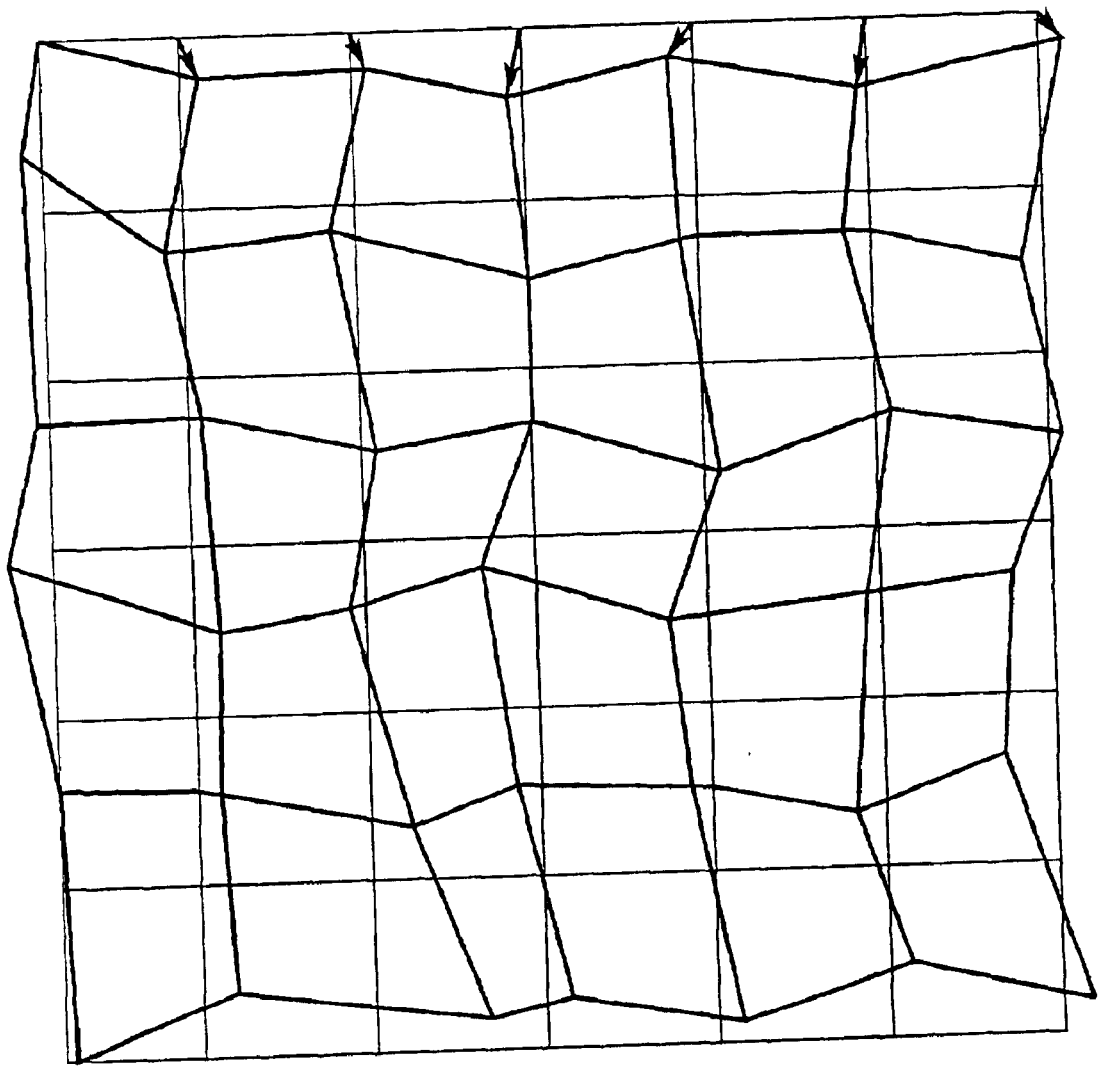
FIG. 7 is a diagram illustrating a wafer map that represents inaccuracies in stitching pattern elements in terms of vectors.

After completion of measurements of the amounts of deviations, the amounts of deviations are displayed graphically or in the form of a map to facilitate grasping the results visually. Examples of such a map include a wafer map indicating the results of a measurement of the whole wafer, a chip map indicating the results of a measurement of one chip, and a field map indicating the results of a measurement of one field. Where the results are displayed, if the amount and direction of the deviation are represented in terms of a vector, then the user can easily understand the results. One example of a wafer map using vectors is shown in FIG. 7, where the solid lines indicate vector expressions based on results of measurements. The thin lines indicate ideal vector expressions. The lines connecting the front ends of the vectors are herein referred to as vector expressions.

Where a wafer map is displayed, the average value of deviations of sides of each chip taken in the X- and Y-axis directions, respectively, is displayed in the form of a vector. Where a chip map is displayed, the average value of deviations of plural stitched pattern elements at boundaries is displayed in the form of a vector. Thus, one can easily grasp the state, or deviation, more precisely. It is possible to grasp the tendency of deviations of stitchings of pattern elements from these maps. A portion of the electron beam lithography system that should be readjusted can be easily judged from the tendency.

In accurately measuring the amounts of deviations at the boundaries, remeasurements are made for all the inspected regions. The procedures for the remeasurements are as follows. The wafer specimen is moved into the center of the first inspected region found to have deviated. An image signal is accepted at a high magnification. The magnification is calculated from the amount of deviation measured during detection. The magnification used for remeasurement is set for the readjustment, i.e., the first magnification is increased manifold.

After all high-magnification images have been accepted in this way, the amounts of deviations of the images are remeasured and stored as a database. The amounts of deviations are measured by adding this process step. The amounts of deviations measured accurately in this way are displayed in the form of a map.

As mentioned previously, a pattern is written into a certain chip only by one deflection system such that no boundaries are created in gates or contact holes which affect the performance of the LSI device, and this is used as a reference chip. It is cumbersome, however, to create a special chip having a critical pattern that has no boundaries and greatly affects the performance of the LSI prior to inspection and measurement. Therefore, the reference image can be accepted as an alternative method as follows.

For example, where plural identical patterns exist on a wafer, if the pattern on one region has a boundary but the pattern on another region has no boundary, then the pattern having no boundary is used as a reference pattern. The pattern having the boundary is used as an inspected pattern. If the same pattern as the pattern on the inspected region exists near a field boundary or on a different region of the chip and has no boundary, then the pattern can be stored as a reference image. Where the same pattern does not exist within the field of view, it is possible to know the location of the pattern within another field of view by comparing the pattern with a CAD (computer-aided design) pattern used for designing an LSI.

Deviations at boundaries can be directly detected by image processing as described above. To carry out the detection relatively simply, a method of indirectly calculating the amount of deviation by image matching can be used. Specifically, the above-described concept consists of inspecting a pattern having a boundary based on a pattern having no boundary and measuring the amount of deviation at the boundary on the pattern. On the other hand, in the following method, an image containing a boundary is compared against a reference image containing a boundary, and the relative values of their amounts of deviations at the boundaries are measured.

Figure 8A:
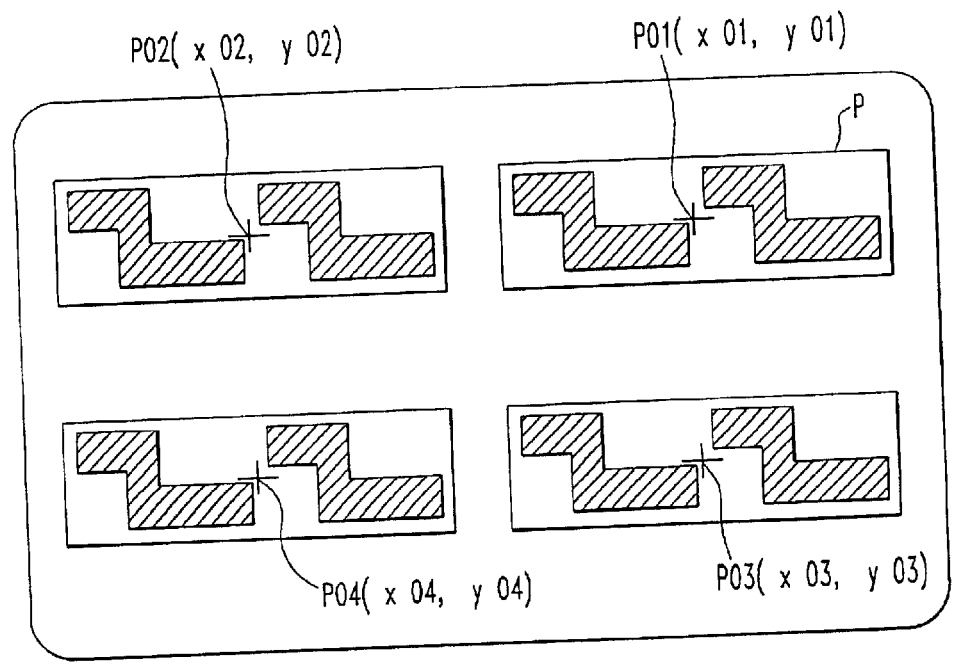
FIGS. 8(a)–8(b) are diagrams illustrating image matching processing performed where repeating pattern elements exist.

For example, as shown in FIG. 8(a), a certain region P within the field of view is registered as an image of a pattern used as a target in specifying the position of the region P within the field of view. The image of the pattern used as a target is hereinafter simply referred to the "target image." This field of view is herein referred as the reference field of view. A region on the specimen corresponding to this reference field of view is a reference region. This registration may be effected by selecting or specifying regions while the operator is observing the scanned image. Alternatively, any desired one may be selected from repeating patterns within a reference field of view by an image processing technique. This registered target image is compared against the image in the reference field of view (reference image) to know whether there is a match. Matching image portions within the reference field of view are extracted. The coordinates of the extracted image portions are registered as P01, P02, P03, and P04.

Figure 8B:
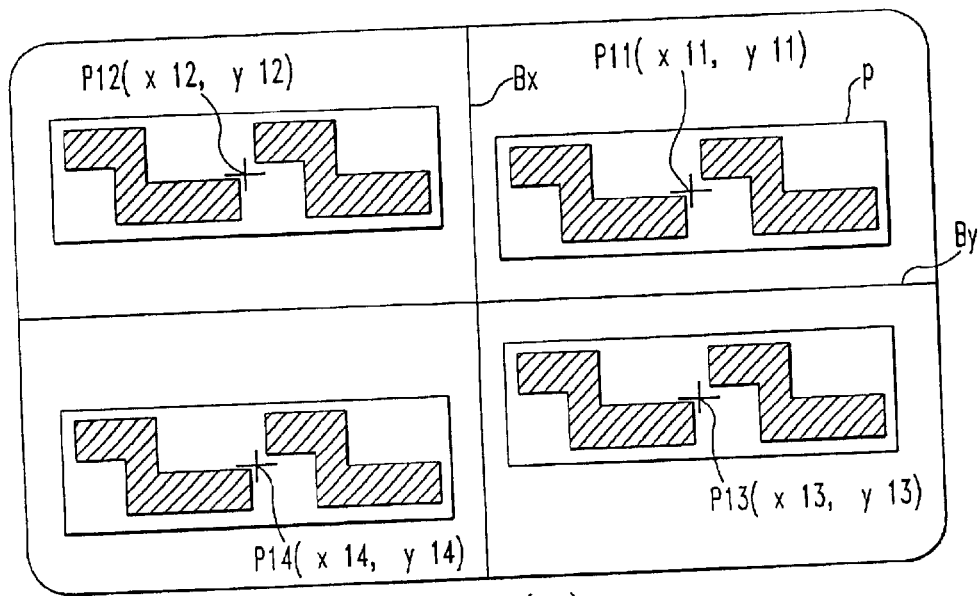
Figure 10:
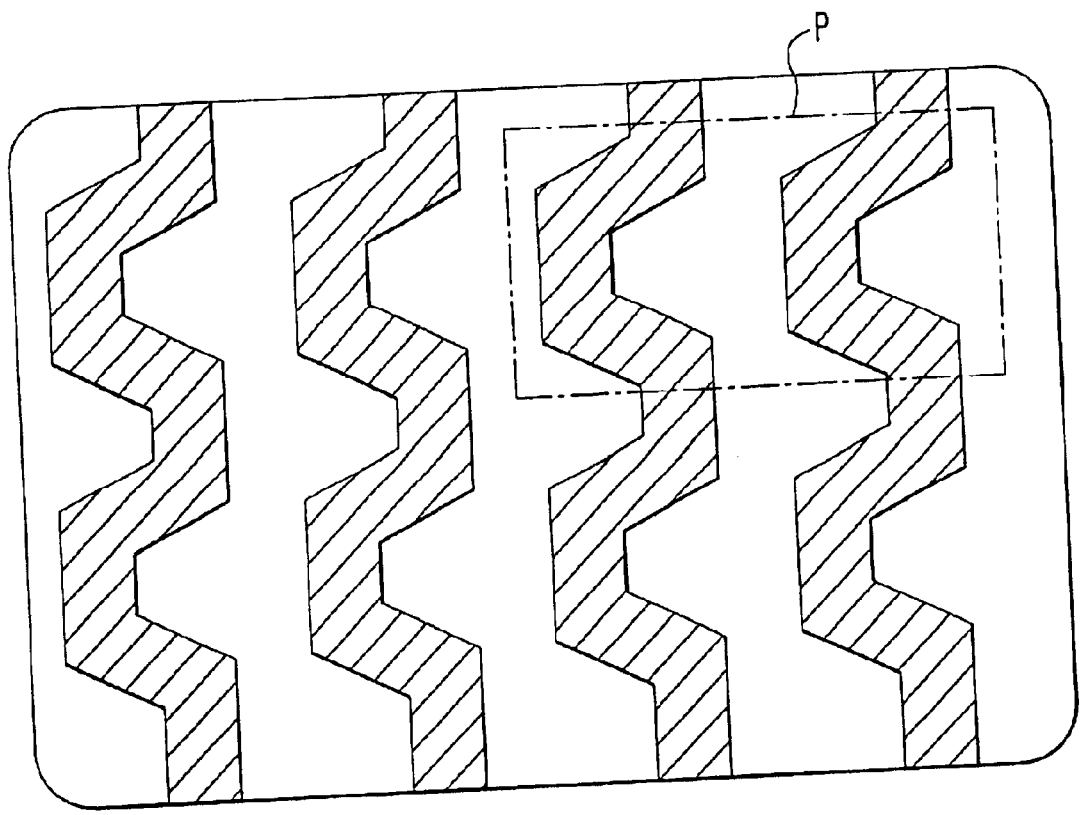
FIG. 10 is a diagram illustrating another example of a specified region of a reference image.

In the reference field of view of FIG. 8(a), if there are four identical patterns, and if a region P surrounding the right upper pattern is registered as a target image, the coordinates of the other identical patterns are automatically registered by image matching techniques. Of course, the registration may be effected manually by the operator. Then, an inspected image as shown in FIG. 8(b) is compared against the target image to know whether there is a match. The matching image portions are extracted. Regions on the specimen which correspond to this inspected image are inspected regions. The coordinates of the extracted image portions are registered as P11, P12, P13, and P14. The coordinates P01, P02, etc. are compared with the coordinates P11, P12, etc. Thus, the amounts of deviations at various portions can be computed. If the coordinates P01, P02, etc. are uniquely defined by the features of the pattern, the position can be in the center, the left upper corner, or any other position. In FIG. 8(a), Bx and By show the boundaries at which stitchings are made. The drawn patterns within the regions P shown in FIG. 8(a) are completely within the extents of the regions P. In the case of FIG. 10, designation and registration may be done such that a region P partially cuts off a continuous pattern to be drawn.

The theory of calculation of the amounts of deviations is as follows. First, it is assumed that an inspected image P11 is coincident in position with the coordinates P01 of the reference image. Then, the deviation of the coordinate P12 of the inspected image from the coordinate P11 is given by $$(P12-P11)-(P02-P01)=(P12-P02)$$

where (P12−P11) is a positional vector of P12 as viewed from P11, (P02−P01) is a positional vector of P02 as viewed from P01, and (P12−P02) is a deviation vector of P12 from P02 (i.e., where based on P02). Accordingly, it can be seen that the drawn region including P12 deviates a distance equal to (P12−P02) as viewed from a drawn region including P11.

From these relations, in the examples of FIGS. 8(a) and 8(b), the deviation of a drawn region (P13−P03) as viewed from a drawn region including P11, the deviation of a drawn region (P14−P04) as viewed from a drawn region including P11, and so forth, can be found. Of course, the calculated amount of deviation varies according to the assumption. Therefore, horizontal misalignment between right and left regions is taken as a deviation of the left region from the right region. Vertical misalignment between upper and lower regions is taken as a deviation of the lower region from the upper region. In this way, deviations are treated in a unified manner.

In this unified treatment, it is assumed that a drawn region including P14 is coincident in position with drawn regions including P12 and P02, respectively. The deviation of a drawn region including P14 from the drawn region including P12 is given by $$(P14-P12)-(P04-P2)=(P14-P04)$$

Figure 9:
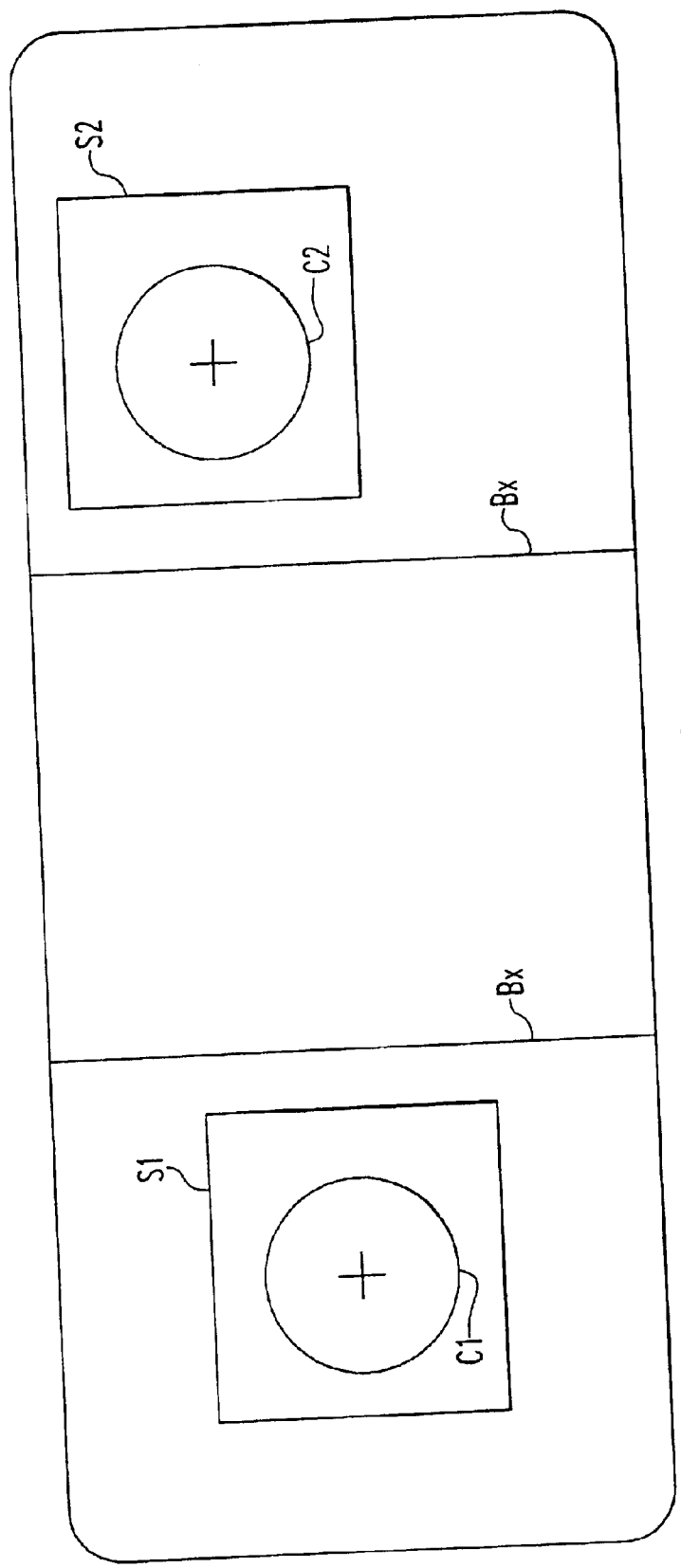
FIG. 9 is a diagram illustrating processing for measuring deviations of the positions of contact holes.

In this way, shifts of the two adjacent drawn regions with respect to each other are found. In this case, these two drawn regions are not always required to be in direct contact with each other. Rather, it is only necessary that the two regions be within the same field of view as viewed from a scanning electron beam. This concept is especially important where shifts of pattern elements not in direct contact with each other are discussed. One example is shown in FIG. 9, where a third drawn region is interposed between a drawn region including contact hole C1 and a drawn region including contact hole C2, and shifts of the contact holes C1 and C2 are detected.

Where the third drawn region is located between the drawn region including the contact hole C1 and the drawn region including the contact hole C2 in this way, some care must be exercised in setting the field of view (scanned region) for inspection. That is, a field of view (scanned region) used for an inspection should be so set that some location at a boundary is brought to the center. Accordingly, if any location at the boundary Bx on the left side of FIG. 9 is brought to the center, the contact hole C2 on the right side may not be within the field of view (scanned region). In this case, the magnification for the scanning is lowered to widen the field of view (scanned region) for inspection, or the coordinates of the center of the field of view (scanned region) for inspection is set midway between the positions of C1 and C2 of FIG. 9.

Figure 11:
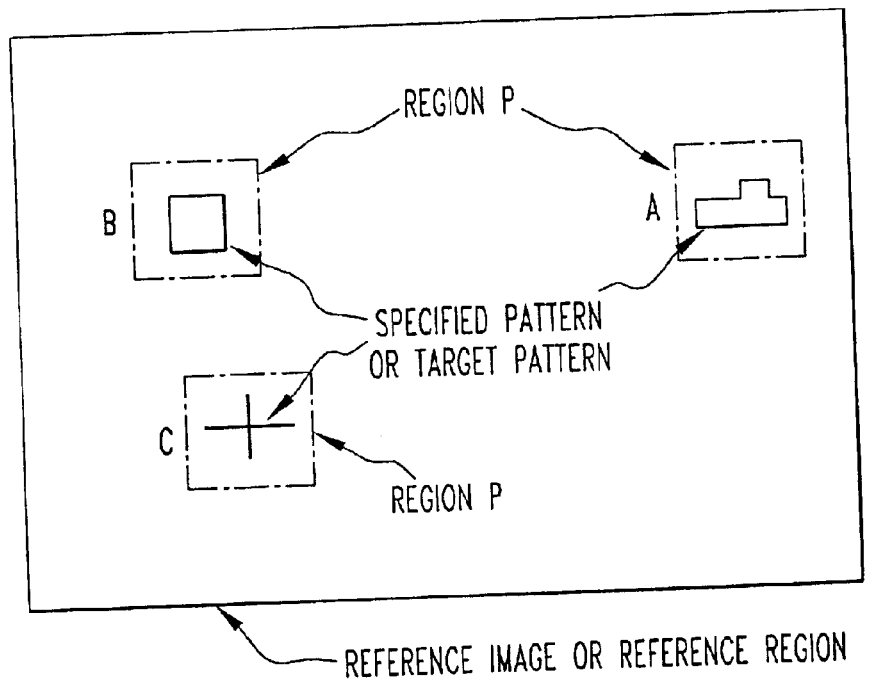
FIG. 11 is a diagram illustrating one example of a specified pattern being different in shape from each other.
Figure 11:
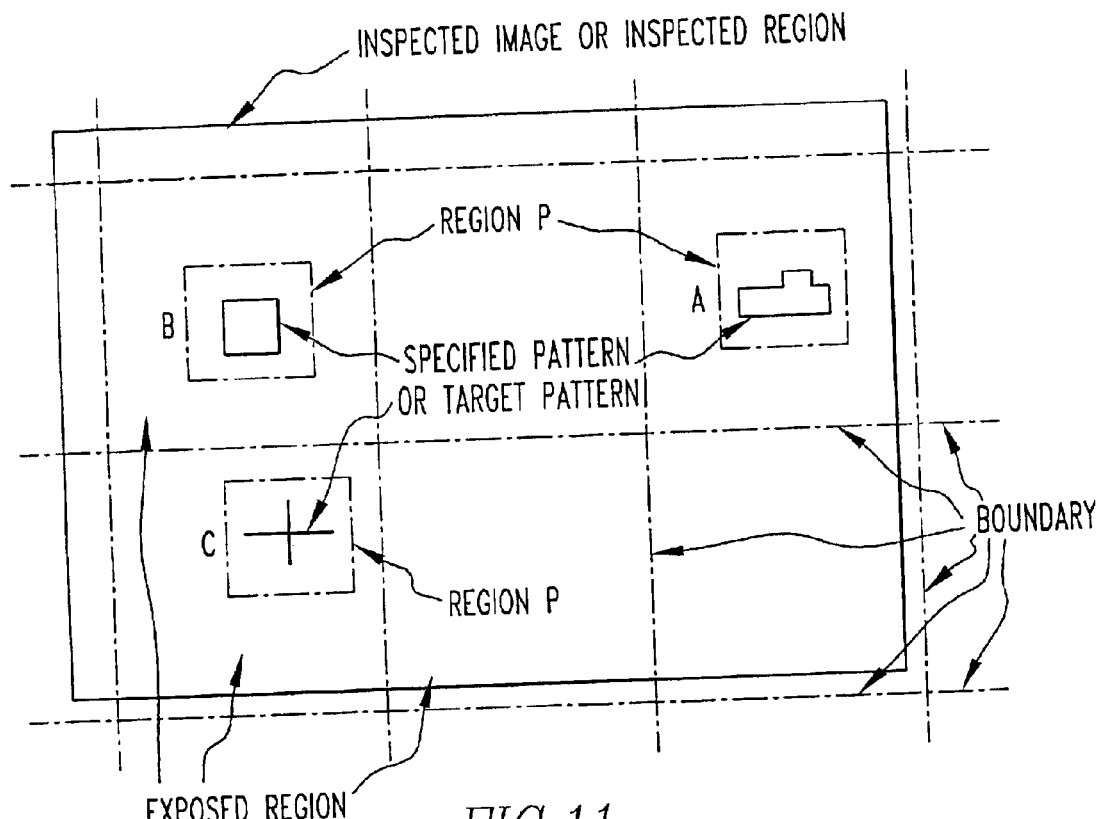

Note that these target images or target patterns are not always one in kind or shape within the same reference field of view. Pattern elements of different geometries within the same reference field of view may be treated as target images. In particular, a region of a pattern of geometry A is taken as a first target image. A region of a pattern of different geometry B is taken as a second target image. A region of a pattern of geometry C is taken as a third target image. The coordinates of these target images are detected, and the values of their relative positions can be found (see FIG. 11).

Numerical data, such as P01, P02, etc. or (P02−P01), (P04−P02), etc., directly found from images within the reference field of view may be created from CAD data or pattern data. As such, if deviations are present at boundaries within the reference field of view, numerical data used for comparison can use design values free from deviations. Furthermore, such numerical data may be treated as attribute data about images (reference image) within the reference field of view or about the image of the target pattern.

The above-described method assumes that the reference field of view contains every target pattern within the same field of view. It is not always required that every target pattern be contained within the same field of view. That is, plural target images, such as first and second target images, are extracted from separately obtained images. The spaces (such as (P02−P01), (P04−P02), etc.) between them are found from CAD data or the like and can be contained in attribute data. Instead of having attribute data, plural target images may be synthesized into one reference image.

Then, P11, P12, etc. or (Pl2−P11), (Pl4−P12), etc. are found for inspected images derived from inspected regions as mentioned previously. They are compared with each other, and their deviations are found.

If only one pattern existing on a chip has a boundary, the following procedures are effected. Portions of this pattern not containing this boundary are extracted as parts of the pattern on the inspected image by an image processing technique. The positional relations among the extracted portions are determined using numerical values as derived from CAD data. The image free from boundary deviations is artificially synthesized using the numerical data. This function is herein referred to as retouching function. This image can be taken as a target image.

In creating this image free from boundary deviations, the design pattern element in the inspected location can be known by examining a CAD pattern corresponding to the coordinates of this location. In consequence, a synthesized image free from boundary deviations can be easily created.

Furthermore, the obtained image data including the boundary can be sent to a personal computer. The image can be displayed on this computer. An image can be created by manually tracing the contour of the image to correct the shape of the boundary. Alternatively, a two-valued (black-and-white) image or a filtered gray-level image is created and can be sent as a target image or reference image to the system of FIG. 4.

Where a CAD pattern is used as a target image or a reference image, the CAD pattern is downloaded into a dedicated computer. A user observes the pattern on the CAD monitor. A virtual region including pattern elements located on the opposite sides of a boundary, or spanning the boundary, is specified. The pattern element in this region can be downloaded as a target image or reference image into the inspection system of FIG. 4. The CAD pattern referred to herein can include a CAD pattern obtained by reconstructing a CAD pattern into pattern data adapted for delineation.

The method of gaining a reference image, the method of comparing an inspected image with the reference image, the method of measuring deviations at boundaries, and the method of displaying the results of measurements have been described. The method of gaining the reference image, the method of comparing an inspected image with the reference image, and measurements of deviations at boundaries are summarized as follows.

Figure 12A:
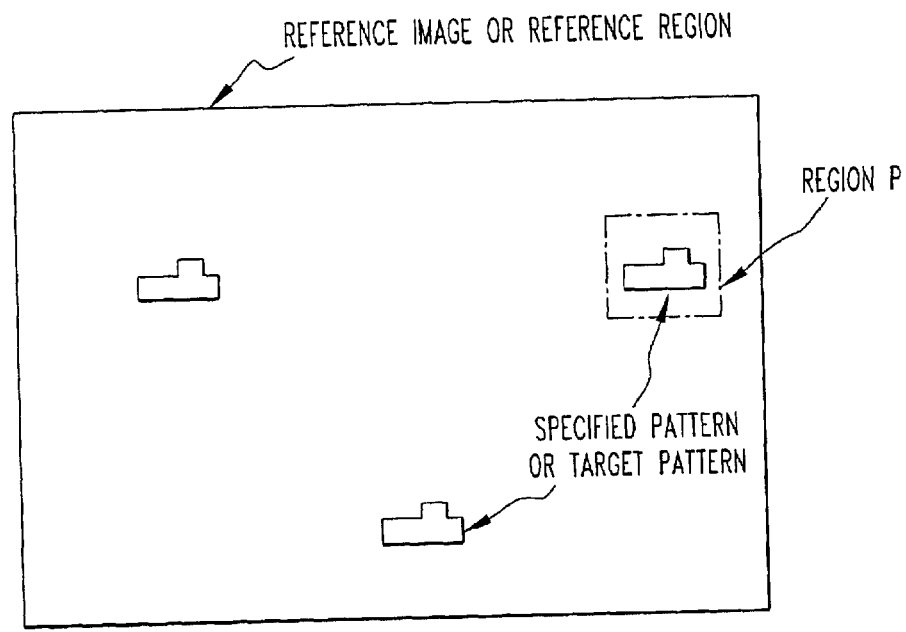
FIGS. 12(a)–12(c) are diagrams showing examples of a reference image having no boundary, an inspected image, and a reference image having boundaries.

The theory is as follows. First, a special reference chip having no boundary deviation is created. A reference image is gained using this reference chip (see FIG. 12(a)). The reference image (of FIG. 12(a)) is compared with a pattern having a boundary and located in an inspected region (of FIG. 12(b)), and the amount of deviation at the boundary is measured. A large number of such measurement values are derived over the whole wafer surface, for example. A diagram showing the distribution of the amounts of deviations over the whole wafer surface is displayed using the measurement values.

A first method of obtaining the reference image is based on the above-described theory. A special reference chip having no boundary deviation is created. A reference image (of FIG. 12(a)) is obtained using this reference chip. In practical applications, however, it is difficult to create such a special reference chip having no boundary deviation. Accordingly, we have devised the following method.

A second method of obtaining the reference image consists of discussing CAD data or the like to search for a pattern that is identical with the pattern in an inspected region and has no boundary deviation and obtaining an image of a field of view not including the boundary as a reference image.

In a third method of obtaining the reference image, if the pattern within the field of view for obtaining a reference image has a boundary, the pattern can be used as a reference image showing a correct positional relation by using CAD data or the like regarding the region spanning the boundary. This method makes it possible to use plural reference patterns derived from different fields of view as reference images by determining positional relations by the use of CAD data.

Figure 12B:
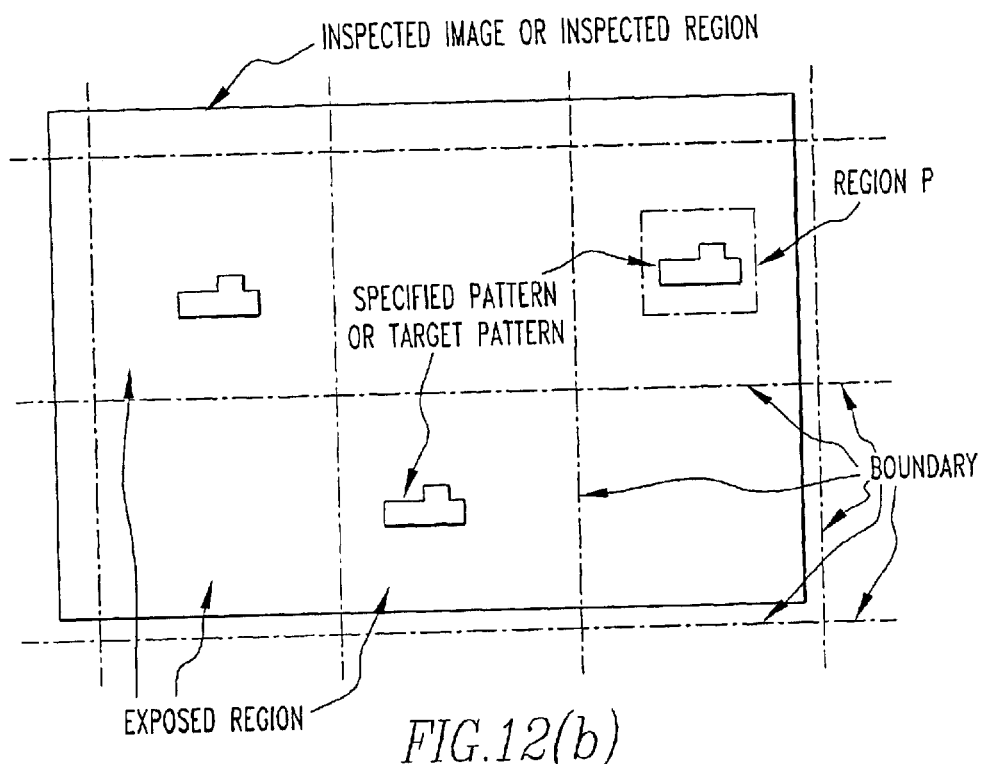
Figure 12C:
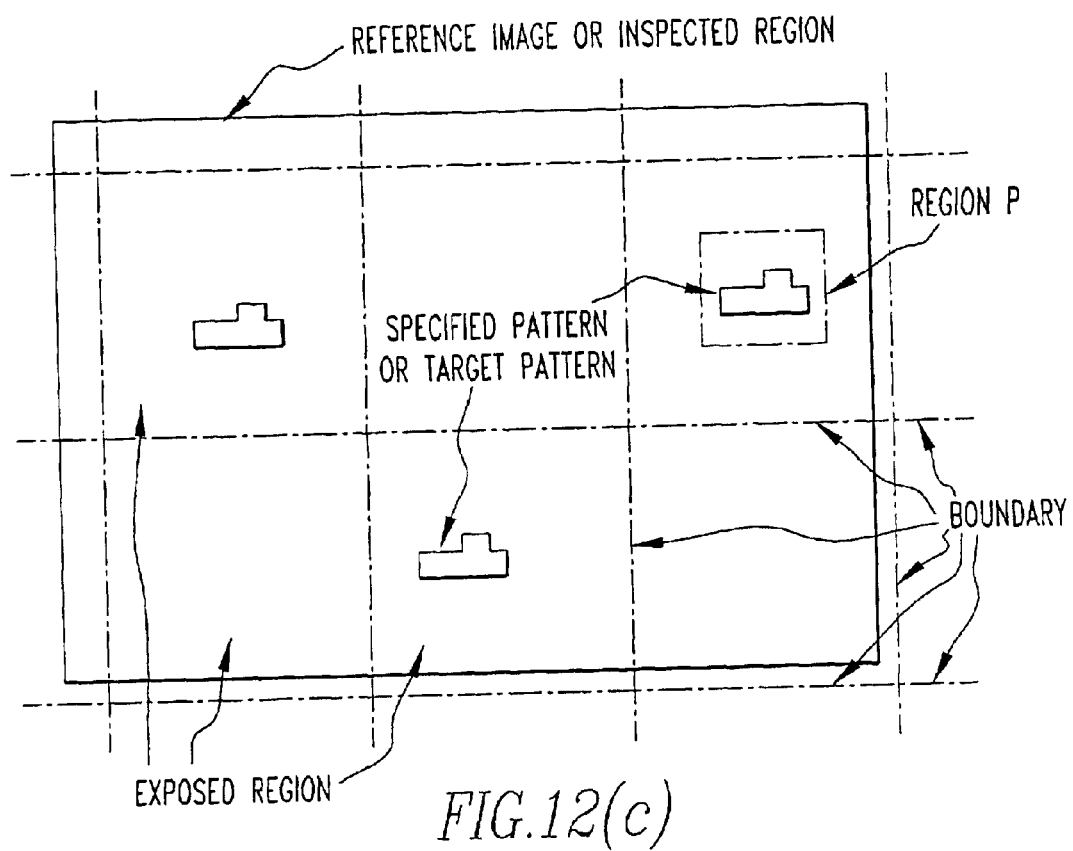

A fourth method of obtaining the reference image is to use an image from a field of view that might have a boundary deviation as a reference image intact (see FIG. 12(c)). This is used for measurements of relative amounts of deviations as described later.

Methods of measuring deviations at boundaries are summarized as follows. A first method of comparing an inspected image with a reference image and measuring the deviation at a boundary consists of comparing the inspected image (FIG. 12(b)) with the reference image (FIG. 12(a)) having no boundary deviation and measuring the amount of deviation at the boundary.

A second method of comparing an inspected image with a reference image and measuring the deviation at the boundary consists of comparing an inspected image (of FIG. 12(b)) with a reference image (of FIG. 12(c)) that might have a deviation at a boundary and measuring the amount of relative deviation at the boundary.

This method of measuring the amounts of relative deviations is useful because the purpose of measurement may not be associated with deviations at boundaries of individual pattern elements but to know the distribution of amounts of deviations at the boundaries over the whole wafer or over the whole chip on which a pattern is delineated. For example, if deviations in a pattern identical with a pattern contained in the reference image are measured using the single reference image over the whole wafer, variations in deviation among various portions of the wafer can be sufficiently grasped provided deviations are present within the reference image.

While the preferred embodiment of the present invention has been described, the invention is not limited thereto but rather various changes and modifications are possible. In the above embodiment, after all images of inspected portions are accepted, deviations at boundaries are detected and measured. Alternatively, whenever an image is gained from an inspected portion, the deviation at the boundary may be detected and measured.

Where a reference pattern having no boundary is built into certain chips on wafers, the certain chips are not always required to be fabricated on all the wafers of the same kind.

The inspected objects are not limited to wafers on which patterns have been lithographically defined directly by the electron beam lithography system. Masks used for exposure of LSI patterns and fabricated by an electron beam lithography system, a laser lithography system, or a light-andelectron, mix-and-match technique can be similarly inspected and measured. Furthermore, masks created by a stepper exposure system using light, an electron beam, UV, or EUV as a light source may be similarly inspected and measured. Moreover, daughter masks created by combining patterns or pattern elements, which are created by optically exposing master masks by ⅕ reduction projection technology, can be similarly inspected and measured.

An exposure mask consists of a thick quartz glass on which a pattern is delineated. In the inspection stage, the material defining the pattern may still be resist or the fabrication of the mask has progressed considerably. Furthermore, a stencil mask consisting mainly of a silicon wafer instead of glass and an X-ray mask can also be inspected.

In the embodiment described above, patterns are mainly created by an electron beam that is scanned or has a cross section of a variable shape. Obviously, however, the inspection method in accordance with the present invention can also be applied to a pattern created by exposing desired regions in succession by a cell projection exposure technique and splicing them together, provided the pattern has boundaries. In the cell projection exposure technique, desired regions are exposed simultaneously by light, an electron beam, an ion beam, or laser light. In this context, "exposure" may be wider in scope than "lithography". Both terminologies are herein construed widely so that both embrace each other.

In the above-described embodiment, an electron beam inspection machine is taken as an example of a charged-particle beam inspection machine. The invention is not limited thereto. The invention can also be applied to other kinds of beam inspection machines, such as a laser beam inspection machine, ion beam inspection machine, and optical inspection machine.

Furthermore, in the above embodiment, an image is gained by a scanning method. Obviously, similar inspection can be performed by a method of projecting or enlarging an image by electrons or light and obtaining the image by a CCD camera or the like.

Additionally, in the above embodiment, positional data are made ancillary to image data, for the sake of illustration. Conversely, image data may be made ancillary to positional data.

As described in detail thus far in the present invention, data obtained from an inspected region is compared with data obtained from a reference region. Exposure regions within the inspected region are exposed separately. The accuracy at which the exposure regions are stitched can be inspected accurately and quickly. If an actual specimen from which data should be gained regarding the reference region has deviations at boundaries, the data can be treated equivalently with data obtained from a pattern having no deviations at boundaries by utilizing CAD data. Additionally, desired objects can be attained, if there are deviations at boundaries in a reference region from which data should be taken, by comparing data derived from an inspected region with data derived from the reference region.

Having thus described our invention with the detail and particularity required by the Patent Laws, what is desired protected by Letters Patent is set forth in the following claims.

What is claimed is:

1. A method of inspecting the accuracy at which desired regions of a pattern formed by beam lithography are stitched on a material, which regions have been exposed successively to form said pattern comprising pattern elements which normally abut and align across exposure boundaries, said method comprising the steps of:

selecting an inspected region containing at least two specified pattern elements existing in said exposed regions, said inspected region having at least one exposure boundary at which at least one stitching line exists between two normally abutting and aligned pattern elements;

detecting signals arising from said inspected region;

detecting positions of said specified pattern elements within said inspected region from said detected signals;

obtaining data about a reference region corresponding to said inspected region and treating said data as reference data;

finding positions of said specified pattern elements within said reference region from said reference data; and comparing said positions of said specified pattern elements within said reference region with said positions of said specified pattern elements within said inspected region, such that inspecting accuracy at which the exposed regions within said inspected region are stitched relative to the stitching of the exposed regions in the reference image is determined.

2. The method of claim 1, wherein the positions of said specified pattern elements within said inspected region or said reference region are defined by the distances from the position of one of specified pattern elements within said region.

3. The method of claim 1 or 2, wherein said step of comparing said positions of said specified pattern elements within said reference region with said positions of said specified pattern elements within said inspected region consists of taking the difference between positions of said specified pattern element within said inspected region and positions of said specified pattern elements within said reference region corresponding to said specified pattern elements within said inspected region.

4. The method of claim 1 or 2, wherein any one of the specified pattern elements within said inspected region is different in feature or shape with other specified pattern elements within said inspected region, and wherein any one of the specified pattern elements within said reference region is correspondingly different in feature or shape with other specified elements within said reference region.

5. The method of claim 1 or 2, wherein data about said reference region is obtained by detecting a signal derived from an exposure pattern having no boundary and obtaining an image.

6. The method of claim 1 or 2, wherein at least a part of data about said reference region or data about positions of the specified pattern elements is created from CAD data or pattern data for lithography.

7. The method of claim 1 or 2, wherein image data or data extracted from image data is ancillary to data about position of said inspected region or to data about position of said reference region.

8. The method of claim 1 or 2, wherein positional data or data extracted from image data is ancillary to image data about said specified pattern elements.

9. The method of claim 1 or 2, wherein data extracted or created from CAD data or pattern data for lithography is ancillary to positional data about said inspected region or to positional data about said reference region.

10. The method of claim 1 or 2, wherein data extracted or created from CAD data or pattern data for lithography is ancillary to image data about said specified pattern elements.

11. The method of claim 1 or 2, wherein said signal is produced by irradiating said inspected region or said reference region with a focused electron beam while scanning the beam.

12. The method of claim 1 or 2, wherein said signal is produced by irradiating said inspected region or said reference region with light or an electron beam, and wherein said signal is detected as an image by projecting and enlarging light or electrons emanating from said inspected region or said reference region.

* * * * *